United States Patent
Du et al.

(10) Patent No.: US 9,162,530 B2
(45) Date of Patent: Oct. 20, 2015

(54) TIRE WITH RUBBER TREAD CONTAINING PRECIPITATED SILICA AND FUNCTIONALIZED CARBON NANOTUBES

(71) Applicant: The Goodyear Tire & Rubber Company, Akron, OH (US)

(72) Inventors: Ling Du, Fairlawn, OH (US); Xiaoping Yang, Streetsboro, OH (US); Carl Trevor Ross Pulford, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 403 days.

(21) Appl. No.: 13/766,893

(22) Filed: Feb. 14, 2013

(65) Prior Publication Data

US 2014/0228478 A1   Aug. 14, 2014

(51) Int. Cl.
*B60C 1/00* (2006.01)
*C08K 3/04* (2006.01)
*C08K 3/36* (2006.01)

(52) U.S. Cl.
CPC .............. *B60C 1/0016* (2013.04); *C08K 3/04* (2013.01); *C08K 3/36* (2013.01)

(58) Field of Classification Search
CPC .............. C08K 3/04; C08K 3/36; C08L 9/00; B60C 1/0016
See application file for complete search history.

(56) References Cited

U.S. PATENT DOCUMENTS

| | | | | |
|---|---|---|---|---|
| 6,476,154 | B1 | 11/2002 | Maly et al. | 525/332.6 |
| 7,479,516 | B2 * | 1/2009 | Chen et al. | 524/495 |
| 2006/0061011 | A1 | 3/2006 | Kikuchi et al. | 264/289.3 |
| 2008/0194737 | A1 | 8/2008 | Chen et al. | 524/35 |
| 2010/0078194 | A1 | 4/2010 | Bhatt et al. | 174/110 SR |
| 2011/0146859 | A1 | 6/2011 | Schmitz et al. | 152/152.1 |

FOREIGN PATENT DOCUMENTS

| | | | | |
|---|---|---|---|---|
| DE | 102007056689 | | 5/2009 | B60C 1/00 |
| JP | 2009046547 | | 3/2009 | B60C 1/00 |
| KR | 102005-002741 | | 3/2005 | C08K 3/04 |
| KR | 200635604 | | 10/2006 | C08K 3/04 |
| KR | 2012133258 | A * | 12/2012 | |
| WO | 03/060002 | | 7/2008 | C08K 7/06 |

OTHER PUBLICATIONS

Machine translation of KR 2012133258 A, Dec. 2012.*

* cited by examiner

*Primary Examiner* — Vickey Nerangis
(74) *Attorney, Agent, or Firm* — Henry C. Young, Jr.

(57) ABSTRACT

This invention relates to a tire having a rubber tread containing functionalized carbon nanotubes and particulate reinforcement comprised of precipitated silica.

13 Claims, No Drawings

TIRE WITH RUBBER TREAD CONTAINING PRECIPITATED SILICA AND FUNCTIONALIZED CARBON NANOTUBES

FIELD OF INVENTION

This invention relates to a tire having a rubber tread containing functionalized carbon nanotubes and particulate reinforcement comprised of precipitated silica.

BACKGROUND OF THE INVENTION

It is sometimes desired to provide a tire with a rubber tread to promote reduced rolling resistance for the tire itself and thereby improved fuel economy for an associated vehicle, as well as reduced heat buildup in the tire tread during operation of the tire which, in turn, is expected to promote improved tire tread durability.

To promote such one or more of such desirable properties, it is sometimes desired to promote a reduction in the hysteretic property of the tread rubber.

To promote a reduction in the hysteresis of the tread rubber (e.g. to promote a reduction in the rubber's physical rebound property) it may desired to significantly reduce its reinforcing carbon black content with an attendant increase its precipitated silica content.

The rubber reinforcing carbon black content of the tread rubber may be reduced, for example, to less than 30 phr or even less than 20 phr or even reduced to a maximum of 10 phr which, in turn promotes a significant increase in electrical resistivity (decrease in electrical conductivity) of the rubber composition. This may significantly increase electrical resistance to passage of static electrical electricity (thereby promoting a buildup of static electricity) between the tire and the running surface (the ground-contacting surface) of the tire tread, particularly as the carbon black content falls below what is known as its percolation point. Such phenomenon is well known to those having skill in such art.

It would therefore be advantageous to provide a tread rubber composition with significantly reduced rubber reinforcing carbon black content but, nevertheless, to promote an improvement in its electrical conductivity.

For this invention it is proposed to provide an inclusion of significantly electrically conductive carbon nanotubes, particularly functionalized carbon nanotubes, in the tread rubber composition to aid in discharging static electricity through the electrically non-conductive tread to its running surface.

Carbon nanotubes have heretofore been suggested for inclusion in rubber compositions, including tire treads, for various purposes. For example, and not intended to be limiting, see Patent Publications: U.S. Pat. No. 6,476,154, US2006/0061011, US2010/0078194, US2011/0146859, WO2003/060002, DE 102007056689, JP2009/046547, KR 100635604 and KR 2005027415.

In one embodiment, use of functionalized carbon nanotubes in a diene-based elastomer containing rubber composition which contains particulate reinforcement in a form of combination of rubber reinforcing carbon black and precipitated silica (amorphous synthetic precipitated silica which hydroxyl groups on its surface) together with silica coupler for the precipitated silica is contemplated for said tread rubber composition.

The carbon nanotubes are conventionally nano-sized particles in a sense of having an average diameter in a range of from about 1 nm to about 100 nm and an average L/D (length to diameter dimension, or ratio) in a range of from about 10/1 to about 10,000/1.

Such carbon nanotubes are conventionally prepared by, for example, by passing a gaseous carbon-containing compound such as for example, at least one of acetylene and ethanol, usually contained in nitrogen or hydrogen through or over a heated catalyst (e.g. heated to about 700° C.) of metal nanoparticles. Carbon deposited on the metallic nanoparticles is a form of the carbon nanotubes is recovered.

One important aspect of this invention is to provide the carbon nanotubes in a functionalized form to promote an electrically conductive property to the rubber composition and to rely on the precipitated silica, together with a coupling agent for the precipitated silica, without an appreciable rubber reinforcing carbon black to provide reinforcement for the rubber composition. The functionalization of the carbon nanotubes is envisioned as promoting their dispersion within the rubber composition and to thereby promote rubber-to-filler (the nanotube filler reinforcement) within the rubber composition to promote low rolling resistance and treadwear resistance for a tire tread rubber composition as well as to promote electrical conductivity for the rubber composition and thereby the tire tread.

It is believed that a tire with a tread which contains a minimal, if any, rubber reinforcing carbon black together with having a significant functionalized carbon nanotube content is a departure from past practice.

It is envisioned, in one embodiment, that the carbon nanotubes may be coupled to the diene-based elastomer(s) of the rubber composition by a nanotube coupling agent to thereby rely on pi-pi (π-π) bonding of the carbon nanotubes to the diene-based elastomer(s) and sulfur bonding to, or sulfur co-curing with, the diene based elastomer(s). There the nanotube coupling agent has a moiety with pi electron configuration to bond to the carbon nanotubes also having a pi electron configuration to from a pi-pi network and another different moiety comprised of a polysulfide moiety to interact with carbon-to-carbon double bonds of the diene-based elastomer(s) of the rubber composition or comprised of a carbon-to-carbon double bond to sulfur co-cure with the diene-based elastomer(s).

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

SUMMARY AND PRACTICE OF THE INVENTION

In accordance with this invention, a tire is provided with a circumferential rubber tread of a tread rubber composition which comprises, based upon parts by weight per 100 parts by weight rubber (phr):

(A) 100 phr of at least one diene-based elastomer, (B) rubber reinforcing filler comprised of precipitated silica, together with silica coupler for the precipitated silica having a moiety reactive with hydroxyl groups (e.g. silanol groups) on the precipitated silica and another, different, moiety interactive with said diene-based elastomer(s), (C) about 0.5 to about 30, alternately from about 1 to about 10, phr of carbon nanotubes having an average diameter in a range of from about 5 to about 20 nanometers (nm) and an L/D (length over diameter) dimensional ratio in a range of from about 100 to about 1000.

In one embodiment, said tread rubber composition contains rubber reinforcement of less than 30, alternately less than about 20, and alternately less than about 10, phr of rubber reinforcing carbon black.

In one embodiment, said nanotubes are functionalized with a nanotube coupler having a moiety with a pi electron network.

Representative of such graphene coupler compounds are illustrated by the following Chemical Structures (1), (2) and (3). Such Chemical Structures are comprised, or contain, a conjugated carbon structure which can interact with the carbon nanotubes through pi-pi interaction.

Chemical Structure (1)

In the Chemical Structure (1), A represents the backbone of the carbon nanotube coupler, which is a low molecular weight polymer of polyaryleneethynylene, including but not limited to, the following polymers, poly(phenylene ethynylene), poly(thiophene ethynylene) and poly(fluorene ethynylene). In the Chemical Structure (1), B represents optional side chains attached to the coupler backbone A as compatiblizer to diene-based elastomer matrix, which can be, for example, at least one alkane hydrocarbon group containing from 6 to 20 carbon atoms such as, for example, one or more of decane, nonane, octane, heptane and hexane groups. In the Chemical Structure (1), to enhance the coupler reaction to the diene-based elastomer, a polysulfide end functional group C, is attached to the coupler backbone A. C can be, for example, at least one 1,2-dithiane functional group which contains an average of from 2 to about 4 connecting sulfur atoms.

Chemical Structure (1)

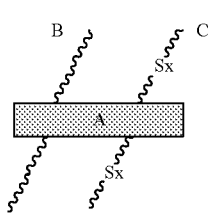

Chemical Structure (2)

In the following Chemical Structure (2), D represents a pyrene structure which can stack to the carbon nanotube surface by pi-pi interaction, while E represents a polysulfide moiety containing 2 to 4 sulfur atoms which can react with the diene-based elastomer(s).

D-E            Chemical Structure (2)

Chemical Structure (3)

In the following Chemical Structure (3), D represents a pyrene structure, F represents functional groups containing carbon-carbon double bond which can interact with diene-based elastomers by sulphur co-cure process (sulfur co-curing of the compound of Chemical Structure (3) with diene based elastomers).

Chemical Structure (3)

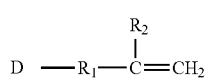

For the above Chemical Structure (3), $R_1$ can be any carbonhydrate connection, for example an ester connecting group, and $R_2$ can be hydrogen or —$CH_3$ radical.

One example of the carbon nanotube coupling agent can be 1-Pyrenemethyl methacrylate, and the chemical structure is shown in the following, which is an example of the aforesaid Chemical Structure (3).

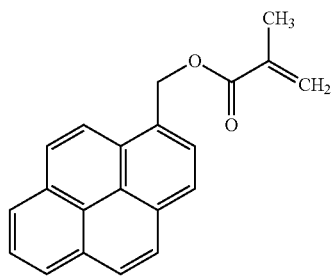 [SMILES: C=C(C)C(=O)OCc1ccc2ccc3cccc4ccc1c2c34]

In practice, various diene-based elastomers may be used for the rubber composition of said tread strip such as, for example, polymers and copolymers comprised of at least one monomer comprised of at least one of isoprene and 1,3-butadiene and from styrene copolymerized with at least one of isoprene and 1,3-butadiene.

Representative of such conjugated diene-based elastomers are, for example, comprised of at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In one aspect, the conjugated diene-based elastomer may be an elastomer such as, for example, styrene/butadiene copolymer containing at least one functional group reactive with hydroxyl groups on a precipitated silica such as, for example, comprised of at least one of siloxy, amine and imine groups.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica employed in this invention are typically aggregates obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 309 (1938), as well as ASTM D5604 for precipitated silica.

The silica may also be typically characterized by having a dibutylphthalate (DBP) absorption value in a range of about 50 to about 400 cc/100 g, and more usually about 100 to about 300 cc/100 g (ASTM D2414).

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

Various coupling agents, as previously described, may be used if desired to aid in coupling the silica (e.g. precipitated silica with hydroxyl groups on its surface), as well as interacting with the aforesaid functionalized carbon nanotubes.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing fillers materials such as, for example, the aforementioned rubber reinforcing carbon black and precipitated silica. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may, for example, comprise about 0.5 to about 10 phr, usually about 1 to about 5 phr. Typical amounts of processing aids, if used, may comprise, for example from about 1 to about 50 phr. Such processing aids can include, for example and where appropriate, aromatic, napthenic, and/or paraffinic processing oils. Typical amounts of antioxidants where used may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants, where used, may comprise for example about 1 to 5 phr. Typical amounts of fatty acids, if used, which can include stearic acid and combinations of stearic acid with one or more of palmitic acid oleic acid and may comprise, for example, from about 0.5 to about 3 phr. Typical amounts of zinc oxide may comprise, for example, from about 1 to about 10 phr. Typical amounts of waxes, such as for example microcrystalline waxes, where used, may comprise, for example, from about 1 to about 5 phr. Typical amounts of peptizers, where used, may comprise, for example, from about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents may be used, for example, in an amount ranging from about 0.5 to about 4 phr, or even, in some circumstances, up to about 8 phr.

Sulfur vulcanization accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging, for example, from about 0.5 to about 4, alternately about 0.8 to about 1.5 phr. In another embodiment, combinations of a primary and a secondary accelerator might be used with the secondary accelerator, where used, being usually used in smaller amounts (for example about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used, for example, which are not affected by normal processing temperatures but produce a satisfactory cure at ordinary vulcanization temperatures. Vulcanization retarders might also be used, where desired or appropriate. Suitable types of accelerators that may be used in the present invention may be, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator may be, for example, a guanidine, dithiocarbamate or thiuram compound.

The presence and relative amounts of the above additives are not considered to be an aspect of the present invention, unless otherwise indicated herein, which is more primarily directed to the utilization of functionalized exfoliated graphene platelets in a rubber composition, particularly for tire component.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and reinforcing fillers, including the exfoliated graphene platelets and alternative additional reinforcing fillers such as, for example precipitated silica and rubber reinforcing carbon black mixed in one or more non-productive mix stages. The terms "non-productive" and "productive" mix stages are well known to those having skill in the rubber mixing art.

While various embodiments are disclosed herein for practicing the invention, it will be apparent to those skilled in this art that various changes and modifications may be made therein without departing from the spirit or scope of the invention.

What is claimed is:

1. A tire with a circumferential rubber tread of a rubber composition which comprises, based upon parts by weight per 100 parts by weight rubber (phr):
   (A) 100 phr of at least one diene-based elastomer,
   (B) rubber reinforcing filler comprised of precipitated silica, together with silica coupler for the precipitated silica having a moiety reactive with hydroxyl groups on the precipitated silica and another, different, moiety interactive with said diene-based elastomer(s),
   (C) about 0.5 to about 30 phr of carbon nanotubes having an average diameter in a range of from about 5 to about 20 nanometers and an L/D dimensional ratio in a range of from about 100 to about 1000;
   wherein said tread rubber composition contains less than 30 phr of rubber reinforcing carbon black, and
   wherein the carbon nanotubes are functionalized with a carbon nanotube coupler having moiety containing a pi electron network,
   wherein said carbon nanotube coupler is comprised of a compound having a chemical structure represented by Chemical Structures (1), (2) and (3), namely:

(D) Chemical Structure (1) where A represents the backbone of the carbon nanotube coupler, which is a low molecular weight polymer of polyaryleneethynylene, including but not limited to, the following polymers, poly(phenylene ethynylene), poly(thiophene ethynylene), and poly(fluorene ethynylene), where B represents optional side chains attached to the coupler backbone A as a compatibilizer to diene-based elastomer containing rubber composition comprised of at least one alkane hydrocarbon group containing from 6 to 20 carbon atoms, and where C is a polysulfide end functional group, containing an average of from 2 to about 4 connecting sulfur atoms:

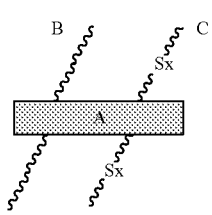

Chemical Structure (1)

(E) Chemical Structure (2) where D represents a pyrene structure which can stack to the carbon nanotube surface by pi-pi interaction, where E represents a polysulfide moiety containing an average of 2 to about 4 sulfur atoms which can react with the diene-based elastomer(s);

Chemical Structure (2)

(F) Chemical Structure (3) where D represents a pyrene structure, where $R_1$ is a connecting group comprised of a carbonhydrate and $R_2$ is hydrogen or —$CH_3$ radical

Chemical Structure (3)

2. The tire of claim 1, where for said tread rubber composition, the carbon nanotubes are coupled to said diene-based elastomers(s) with a coupling agent comprised of a moiety containing pi electrons and another different moiety comprised of a polysulfide containing an average of 2 to 4 connecting sulfur atoms.

3. The tire of claim 2 where, for the tread rubber composition, the coupling agent for the carbon nanotube contains a polymeric backbone comprised of a low molecular weight polyaryleneethynylene containing pi electrons and having an end group which contains at least one polysulfide wherein said polysulfide contains an average of from about 2 to about 4 connecting sulfur atoms.

4. The tire of claim 1 where, for the tread rubber composition, the said diene-based elastomer is comprised of at least one polymer of at least one monomer selected from isoprene and 1,3-butadiene and from styrene copolymerized with at least one of isoprene and 1,3-butadiene.

5. The tire of claim 1 where, for the tread rubber composition, the diene-based rubber is natural cis 1,4-polyisoprene rubber.

6. The tire of claim 1 wherein, for said tread rubber composition, at least one of said diene-based elastomer(s) is least one of tin coupled organic solution polymerization prepared styrene/butadiene copolymers, isoprene/butadiene copolymers, styrene/isoprene copolymers, polybutadiene and styrene/isoprene/butadiene terpolymers.

7. The tire of claim 1 wherein, for said rubber composition, the diene-based elastomer contains at least one functional group reactive with hydroxyl groups on a precipitated silica wherein said functional group is comprised of at least one of siloxy, amine and imine groups.

8. The tire of claim 1 wherein said carbon nanotube coupler is comprised of a compound having a chemical structure represented by Chemical Structure (1) where A represents the backbone of the carbon nanotube coupler, which is a low molecular weight polymer of polyaryleneethynylene, including but not limited to, the following polymers, poly(phenylene ethynylene), poly(thiophene ethynylene), and poly(fluorene ethynylene), where B represents optional side chains attached to the coupler backbone A as a compatibilizer to diene-based elastomer containing rubber composition comprised of at least one alkane hydrocarbon group containing from 6 to 20 carbon atoms, and where C is a polysulfide end functional group, containing an average of from 2 to about 4 connecting sulfur atoms:

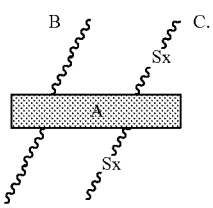

Chemical Structure (1)

9. The tire of claim 8 where, for the tread rubber composition, the said diene-based elastomer is comprised of at least one polymer of at least one monomer selected from isoprene and 1,3-butadiene and from styrene copolymerized with at least one of isoprene and 1,3-butadiene,
wherein, optionally, at least one of said diene-based elastomer(s) is least one of tin coupled organic solution polymerization prepared styrene/butadiene copolymers, isoprene/butadiene copolymers, styrene/isoprene copolymers, polybutadiene and styrene/isoprene/butadiene terpolymers, and
wherein, optionally, at least one of said diene-based elastomers is a styrene/butadiene copolymer which contains at least one functional group reactive with hydroxyl groups on a precipitated silica wherein said functional group is comprised of at least one of siloxy, amine and imine groups.

10. The tire of claim 1 wherein said carbon nanotube coupler is comprised of a compound having a chemical structure represented by Chemical Structure (2) where D represents a pyrene structure which can stack to the carbon nanotube surface by pi-pi interaction, where E represents a polysulfide moiety containing an average of 2 to about 4 sulfur atoms which can react with the diene-based elastomer(s);

Chemical Structure (2)

11. The tire of claim 10 where, for the tread rubber composition, the said diene-based elastomer is comprised of at least one polymer of at least one monomer selected from isoprene and 1,3-butadiene and from styrene copolymerized with at least one of isoprene and 1,3-butadiene, wherein, optionally, at least one of said diene-based elastomer(s) is least one of tin coupled organic solution polymerization prepared styrene/butadiene copolymers, isoprene/butadiene copolymers, styrene/isoprene copolymers, polybutadiene and styrene/isoprene/butadiene terpolymers, and wherein, optionally, at least one of said diene-based elastomers is a styrene/butadiene copolymer which contains at least one functional group reactive with hydroxyl groups on a precipitated silica wherein said functional group is comprised of at least one of siloxy, amine and imine groups.

12. The tire of claim 1 wherein said carbon nanotube coupler is comprised of a compound having a chemical structure represented by Chemical Structure (3) where D represents a pyrene structure, where $R_1$ is a connecting group comprised of a carbonhydrate and $R_2$ is hydrogen or —$CH_3$ radical Chemical Structure (3)

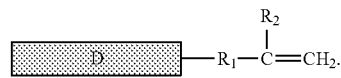

$$\text{D} - R_1 - \underset{\underset{R_2}{|}}{C} = CH_2.$$

13. The tire of claim 12 where, for the tread rubber composition, the said diene-based elastomer is comprised of at least one polymer of at least one monomer selected from isoprene and 1,3-butadiene and from styrene copolymerized with at least one of isoprene and 1,3-butadiene, wherein, optionally, at least one of said diene-based elastomer(s) is least one of tin coupled organic solution polymerization prepared styrene/butadiene copolymers, isoprene/butadiene copolymers, styrene/isoprene copolymers, polybutadiene and styrene/isoprene/butadiene terpolymers, and wherein, optionally, at least one of said diene-based elastomers is a styrene/butadiene copolymer which contains at least one functional group reactive with hydroxyl groups on a precipitated silica wherein said functional group is comprised of at least one of siloxy, amine and imine groups.

* * * * *